(12) United States Patent
Oohara

(10) Patent No.: US 9,906,087 B2
(45) Date of Patent: Feb. 27, 2018

(54) ELECTRIC MOTOR WITH AIR PURGE STRUCTURE

(71) Applicant: FANUC CORPORATION, Yamanashi (JP)

(72) Inventor: Taku Oohara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 199 days.

(21) Appl. No.: 14/745,589

(22) Filed: Jun. 22, 2015

(65) Prior Publication Data

US 2015/0381007 A1 Dec. 31, 2015

(30) Foreign Application Priority Data

Jun. 30, 2014 (JP) ................................. 2014-134123

(51) Int. Cl.
| | | |
|---|---|---|
| *H02K 5/10* | (2006.01) | |
| *H02K 9/02* | (2006.01) | |
| *H02K 5/16* | (2006.01) | |
| *H02K 5/173* | (2006.01) | |
| *H02K 9/00* | (2006.01) | |

(52) U.S. Cl.
CPC ............. *H02K 5/10* (2013.01); *H02K 5/1732* (2013.01); *H02K 9/00* (2013.01); *H02K 2205/09* (2013.01)

(58) Field of Classification Search
CPC ........ H02K 5/10; H02K 2205/09; H02K 5/16; H02K 5/1732; H02K 9/00; H02K 9/02
USPC ...................................................... 310/59, 61
See application file for complete search history.

(56) References Cited

U.S. PATENT DOCUMENTS

| | | | | |
|---|---|---|---|---|
| 7,462,964 B2 * | 12/2008 | Nagayama | ............... | H02K 9/14 310/58 |
| 2012/0194015 A1 * | 8/2012 | Anthony | .................. | H02K 1/20 310/59 |
| 2012/0299404 A1 * | 11/2012 | Yamamoto | ........... | H02K 1/2766 310/61 |

(Continued)

FOREIGN PATENT DOCUMENTS

| | | |
|---|---|---|
| JO | 66958 A | 1/1994 |
| JP | 6137296 A | 6/1993 |

(Continued)

OTHER PUBLICATIONS

English Abstract for Japanese Publication No. 2007-105850, published Apr. 26, 2007, 1 pg.

(Continued)

*Primary Examiner* — Alex W Mok
(74) *Attorney, Agent, or Firm* — Fredrikson & Byron, P.A.

(57) ABSTRACT

An electric motor comprises a tubular housing for holding a rotor core, a shaft which has a first end part projecting outward from the housing and a second end part located inside the housing, and a bearing located between the first end part and the rotor core for rotatably supporting the shaft inside the housing. The housing is provided with an air feed hole to which an air feed source can be connected for feeding air to an inside space where the second end part is located, and the shaft is provided with a bore which extends from an air inflow port formed on the second end part to an air outflow port formed on a circumferential surface of a partial region of the shaft which is located between the first end part and the bearing.

4 Claims, 2 Drawing Sheets

(56) References Cited

U.S. PATENT DOCUMENTS

| | | | | |
|---|---|---|---|---|
| 2012/0306206 A1* | 12/2012 | Agrawal | ............... | F04D 25/024 290/52 |
| 2013/0038151 A1* | 2/2013 | Ohashi | .................... | H02K 1/32 310/59 |
| 2013/0062976 A1* | 3/2013 | Rai | ......................... | H02K 1/32 310/61 |
| 2013/0076169 A1* | 3/2013 | Pal | .......................... | H02K 9/19 310/59 |
| 2013/0119829 A1* | 5/2013 | Andersen | ................ | H02K 1/32 310/60 A |
| 2013/0241326 A1* | 9/2013 | Pal | .......................... | H02K 1/32 310/54 |
| 2013/0257196 A1* | 10/2013 | Yamamoto | ............... | H02K 9/19 310/54 |
| 2013/0334912 A1* | 12/2013 | Tokunaga | ................ | H02K 9/19 310/54 |
| 2014/0097712 A1* | 4/2014 | Kozaka | .................... | H02K 1/32 310/52 |
| 2015/0042185 A1* | 2/2015 | Buttner et al. | ........... | H02K 1/32 310/54 |
| 2015/0084456 A1* | 3/2015 | Chang | ...................... | H02K 1/28 310/61 |

FOREIGN PATENT DOCUMENTS

| | | |
|---|---|---|
| JP | 1058270 A | 3/1998 |
| JP | 2007-105850 A | 4/2007 |

OTHER PUBLICATIONS

English Abstract and Machine Translation for Japanese Publication No. 10-058270 A, published Mar. 3, 1998, 9 pgs.

English Abstract and Machine Translation for Japanese Publication No. 06-006958 A, published Jan. 14, 1994, 8 pgs.

English Abstract and Machine Translation for Japanese Publication No. 05-137296 A, published Jan. 6, 1993, 6 pgs.

* cited by examiner

ELECTRIC MOTOR WITH AIR PURGE STRUCTURE

BACKGROUND OF THE INVENTION

1. Field of the Invention

The present invention relates to an electric motor with an air purge structure for preventing entry of foreign matter such as washing water and cutting oil into a housing.

2. Description of the Related Art

Some spindle motors for various machine tools are used in environments in which washing water, cutting oil, etc., is used. For this reason, many spindle motors are designed to prevent entry of foreign matter such as washing water and cutting oil into a housing by means of a sealed structure with seal members mounted on the joints of component members of the housing and an oil seal inserted in the gap between the housing and output shaft. However, the oil seal mounted on a spindle motor directly contacts an output shaft, and therefore when the output shaft rotates at a high speed, the oil seal is liable to be worn in a short time and cause impaired sealing properties.

In relation to this, JP-A-2007-105850 proposes a spindle motor with an air purge structure for preventing entry of foreign matter into a housing by injecting compressed air into the housing. More specifically, the spindle motor of the JP-A-2007-105850 is provided with an air passage which is formed between the stator core and rotor, and an air discharge path which is formed inside of the front housing so as to bypass an output side bearing. Further, the spindle motor of JP-A-2007-105850 is designed to guide compressed air which is fed into a rear housing, to a ring-shaped opening around a shaft which is formed on the front face of the front housing, through the air passage and air discharge path. This ensures that the compressed air passes through the ring-shaped opening around the shaft to be discharged from the housing, and therefore it is possible to prevent foreign matter such as washing water or cutting oil from entering into the housing through the ring-shaped opening.

However, it is known that negative pressure is generated near the ring-shaped opening while the shaft of the spindle motor is rotating at a high speed. Therefore, when a spindle and a spindle motor of a machine tool are directly coupled, that is, when the ring-shaped opening is located close to the machining area of the machine tool, mist of washing water or cutting oil, etc., will easily be sucked in by the negative pressure and reach the ring-shaped opening. To prevent such a mist from entering into the housing, it is necessary to supply particularly high pressure compressed air to the inside of the housing. However, in the spindle motor of JP-A-2007-105850, before reaching the ring-shaped opening, the compressed air which is fed into the housing has to pass through the narrow air passage between the stator core and rotor and the air discharge path which has a curved shape to bypass the bearing, and therefore the compressed air tends to have a high pressure loss when passing through the inside of the housing.

An electric motor which can reduce the pressure loss to be generated when the purge air fed into the housing reaches the ring-shaped opening around the shaft at the front end of the housing is being sought.

SUMMARY OF INVENTION

According to a first aspect of the present invention, there is provided an electric motor comprising a tubular housing which holds a rotor core, a shaft which is fastened to the rotor core and which has a first end part which projects outward from the housing and a second end part which is located inside the housing, and a bearing which is located between the first end part and the rotor core and which supports the shaft to be able to rotate inside the housing, wherein the housing is provided with an air feed hole to which an air feed source can be connected for feeding air to an inside space where the second end part is located, and the shaft is provided with a bore which extends from an air inflow port which is formed on the second end part to an air outflow port which is formed on a circumferential surface around the rotation axis of a partial region of the shaft which is located between the first end part and the bearing.

According to a second aspect of the present invention, there is provided the first aspect of the electric motor, wherein the bore forms a first air passage which extends from an end face of the second end part along an extension direction of the shaft and a second air passage which extends from a terminal end of an extension direction of the first air passage to the circumferential surface.

According to a third aspect of the present invention, there is provided the second aspect of the electric motor, wherein the second air passage extends vertically with respect the extension direction of the shaft.

According to a fourth aspect of the present invention, there is provided the second aspect of the electric motor, wherein the second air passage extends at a slant with respect to the extension direction of the shaft and in a direction away from the rotor core.

These and other objects, features, and advantages of the present invention will become clearer with reference to the detailed description of an illustrative embodiment of the present invention which is shown in the attached drawings.

DETAILED DESCRIPTION OF EMBODIMENTS

Below, an embodiment of the present invention will be explained in detail with reference to the drawings. Note that the following explanation does not limit the technical scope of the inventions which are described in the claims or the meaning of terms etc.

Figure 1:
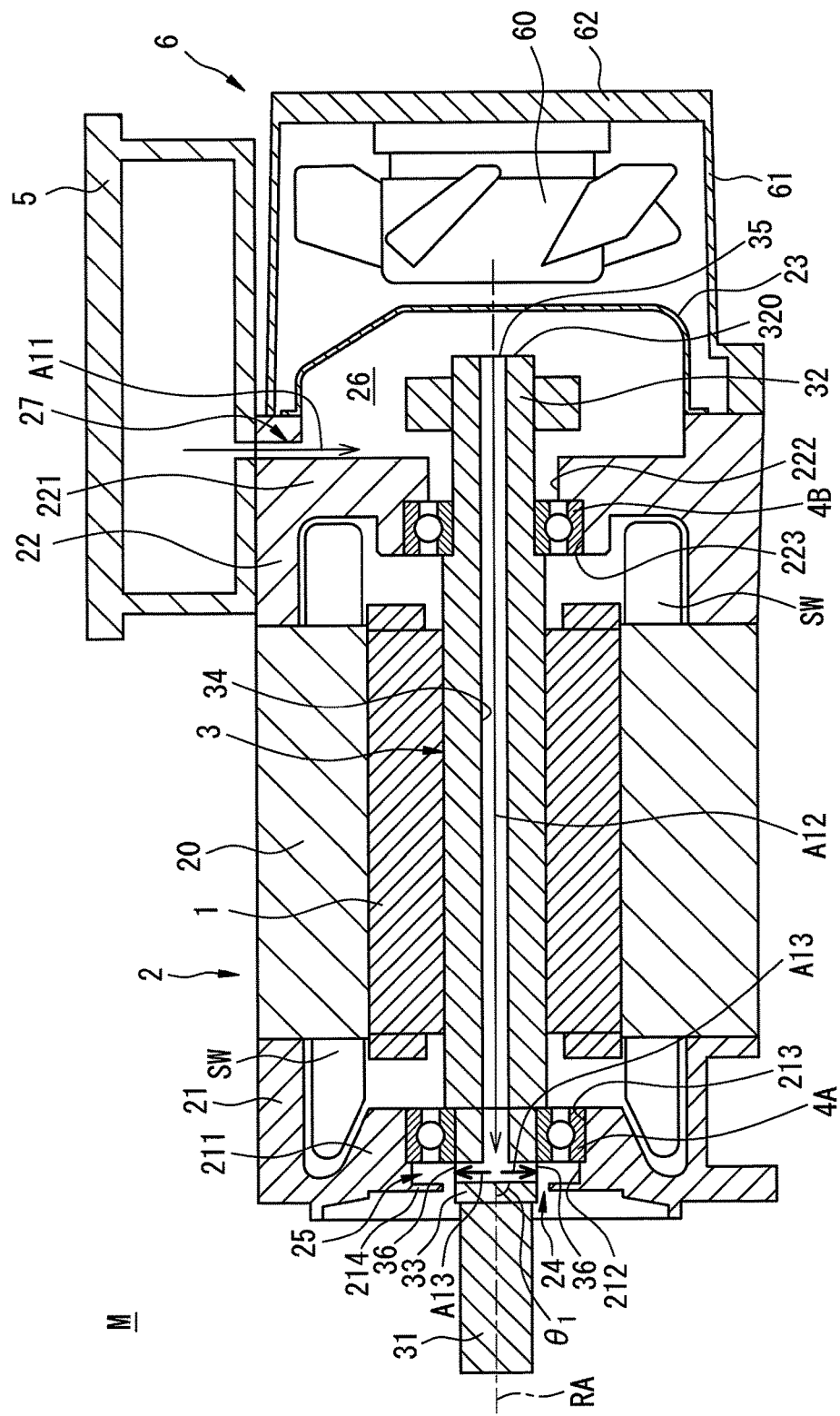
FIG. 1 is a longitudinal cross-sectional view which shows an illustrative electric motor according to one embodiment of the present invention.

Referring to FIG. 1, an electric motor of one embodiment of the present invention will be explained. The electric motor of the present embodiment is a rotary-type electric motor which generates a drive force by cooperative action of a rotor and stator and is typically a spindle motor which drives rotation of various load devices, for example, the spindle of a machine tool. Further, the electric motor of the present embodiment is provided with an air purge structure which prevents washing water and cutting oil or other foreign matter from entering inside the housing. FIG. 1 is a longitudinal cross-sectional view of an illustrative electric motor M according to the present embodiment. As shown in FIG. 1, the electric motor M of the present example is provided with a tubular rotor core 1, a tubular housing 2 which holds the rotor core 1, a shaft 3 which is fastened to the rotor core 1, and a pair of bearings 4A, 4B which rotatably support the shaft 3 inside the housing 2. These elements will be explained in detail below. Note that, in the following explanation, the extension direction of the shaft 3 will sometimes be referred to as the "axial direction".

First, the rotor core 1 of the present example is constructed by stacking a plurality of electrical steel sheets. At the outer circumferential surface, a plurality of plate-shaped permanent magnets (now shown) such as ferrite magnets or neodymium magnets are attached. The rotor core 1 of the present example is configured to rotate about a predetermined rotation axis RA under the influence of the rotating magnetic field which is formed by the current which flows through the later explained stator winding SW and rotate. Next, the shaft 3 of the present example is inserted into a center bore of the rotor core 1 and is supported by the pair of bearings 4A, 4B so as to rotate together with the rotor core 1 about the rotation axis RA. More specifically, the shaft 3 of the present example extends beyond the two ends of the rotor core 1, and is supported by one bearing 4A at the front of the rotor core 1. Similarly, the shaft 3 of the present example is supported at the back of the rotor core 1 by another bearing 4B. The "front" which is the side closest to the first end part 31 of the shaft 3 and projects outward of the housing 2, while the "back" is the side farthest from the first end part 31 of the shaft 3.

Next, the housing 2 of the present example comprises a tubular stator core 20 which is arranged concentrically with the rotor core 1 so as to surround the rotor core 1, a tubular front part 21 which is arranged at the front of the stator core 20, a tubular back part 22 which is arranged at the back of the stator core 20, and a back cover 23 which is arranged at the further back of the back part 22 so as to close the opening of the back end of the back part 22. Here, the stator core 20 of the present example is constructed by stacking a plurality of electrical steel sheets. Inside circumferential surface, a plurality of slots (not shown) which extend along the axial direction are formed at equal intervals. A stator winding SW is arranged in these slots. Lead lines (not shown) of the stator winding SW are electrically connected to the metal terminal parts of a later explained terminal box 5. Therefore, if an AC power supply is connected to the terminal box 5, a rotating magnetic field is formed around the rotor core 1 by the AC current which flows through the stator winding SW.

The stator core 20 of the present example is connected by connecting means (now shown) such as bolts to the front part 21 and the back part 22. Further, the back cover 23 of the present example is connected by connecting means (not shown) such as bolts to the back part 22. As shown in FIG. 1, the housing 2 of the present example is generally sealed from the outer environment except for the ring-shaped opening 24 of the front part 21 and the air feed hole 27 of the back part 22. Further, the back cover 23 of the present example has a hollow cap or hat shape form which projects backward in the axial direction. Further, the back cover 23 of the present example forms, together with the back part 22, an inside space 26 in which the second end part 32 of the shaft 3 is located. The second end part 32 is the opposite end part to the first end part 31 of the shaft 3 explained above. The structures of the front part 21 and the back part 22 of the housing 2 will be explained in detail below.

As shown in FIG. 1, the front end of the front part 21 in the axial direction is provided with a wall part 211 which is arranged vertically to the axial direction. This wall part 211 is provided with a columnar center bore 212 which extends in the axial direction. The inner circumferential surface of the center bore 212 of this wall part 211 is provided with a circumferential groove 213 to which the front bearing 4A is fit. Below, a partial region 33 in the axial direction of the shaft 3 which is located between the first end part 31 of the shaft which projects outward from the front part 21 in the axial direction and the front bearing 4A which is fit in the wall part 211 of the front part 21 will sometimes be called the "partial region 33" to differentiate it from the other partial regions of the shaft 3. Further, the back part 22 of the housing 2 is provided with a wall part 221 which is located at a predetermined position in the axial direction and is oriented vertically to the axial direction. This wall part 221 is provided with a columnar center bore 222 which extends along the axial direction. The inner circumferential surface of the center bore 222 of this wall part 221 is provided with a circumferential groove 223 in which an outer race of the back bearing 4B is fit.

If referring to the front part 21 and its vicinity of the housing 2 in FIG. 1, the wall part 211 of the front part 21 of the present example is further provided with a ring-shaped constricted part 214 which has a center bore of a diameter smaller than the above center bore 212. The ring-shaped constricted part 214 may be formed of an integral part with the wall part 211 or may be formed of a separate part from the wall part 211 to be attached to the wall part 211. As shown in FIG. 1, the diameter of the center bore of the constricted part 214 is made slightly larger than the diameter of the shaft 3 at the position in the axial direction corresponding to the constricted part 214. In this way, between the inner circumferential surface of the constricted part 214 and the outer circumferential surface of the shaft 3, there is a ring-shaped opening 24 which connects the outside and inside of the housing 2. The width of the ring-shaped opening 24 in the radial direction is small enough to prevent the majority of the foreign matter reaching the constricted part 214 from entering into the housing 2. Further, the constricted part 214 of the present example is spaced from the circumferential groove 213 in which the front bearing 4A is fit by a predetermined distance to the front in the axial direction. Therefore, between the constricted part 214 of the front part 21 and the front bearing 4A, there is a hollow cylindrical shaped gap 25 which extends along the axial direction. This gap 25 will sometimes be referred to below as the "axial direction gap 25".

If referring to the back part 22, the back cover 23 and their vicinities of the housing 2 in FIG. 1, a terminal box 5 with connection terminals (not shown) for connecting the electric motor M to the outer power supply is attached to the outer circumferential surface of the back part 22 in the present example. Further, at a fan motor 6 for blowing air along the axial direction so as to cool the electric motor M is attached to the further back of the back cover 23 in the present example. More specifically, the fan motor 6 of the present example has a fan 60 which faces the back end face of the back cover 23, and a tubular main body 61 which extends along the axial direction and holds the fan 60. As shown in FIG. 1, the back end of the main body 61 in the axial direction is provided with an end wall 62 which is oriented vertically in the axial direction. The fan 60 is attached to the inside surface of the end wall 62 of the main body 61. Note that, the end wall 62 of the main body 61 is provided with a plurality of vent holes (not shown) which extend along the axial direction. Further, the front end of the main body 61 in the axial direction is attached to the back end of the back part 22 so as to surround the back cover 23.

Next, the air purge structure of the electric motor M of the present example will be explained. As shown in FIG. 1, the circumferential wall of the back part 22 of the housing 2 of the present example is provided with an air feed hole 27 which connects the inside space 26 of the housing 2 in which the second end part 32 of the shaft 3 is located and the outside space of the housing 2. More specifically, an outer opening of the air feed hole 27 of the present example is formed on the outer circumferential surface of the back part 22 which is covered by the above terminal box 5. Various air feed sources (not shown) can be connected to the outer opening so as to feed purge air to the inside space 26 of the housing 2. The flow path of air which is fed through the air feed hole 27 of the present example to the inside space 26 is shown by the arrow A11 in FIG. 1.

Further, the shaft 3 of the present example is provided with a bore 34 which connects the inside space 26 of the above-mentioned housing 2 and the axial direction gap 25. As shown in FIG. 1, the bore 34 of the present example extends from an air inflow port 35 which is formed on the second end part 32 of the shaft 3 to air outflow ports 36 which are formed on the circumferential surface around the rotation axis RA of the partial region 33 of the shaft 3 explained above. More specifically, the shaft 3 of the present example has the air inflow port 35 which is formed on the end face 320 of the second end part 32 and two air outflow ports 36 which are formed at equal intervals on the circumferential surface of the partial region 33. However, the circumferential surface of the partial region 33 may also be provided with a single air outflow port 36, or three or more air outflow ports 36 which are arranged at equal intervals. As shown in FIG. 1, the air outflow ports 36 of the present example are arranged at the back of the constricted part 214 of the front part 21 of the housing 2 in the axial direction.

As shown in FIG. 1, the bore 34 of the shaft 3 of the present example forms an air passage for guiding purge air which is fed from the air feed hole 27 to the inside space 26 of the housing 2, up to the axial direction gap 25 inside the front part 21. More specifically, the bore 34 of the shaft 3 of the present example forms a first air passage which extends from the air inflow port 35 formed on the end face 320 of the second end part 32 to the partial region 33 along the axial direction (see arrow A12 in FIG. 1) and second air passages which extend vertically to the axial direction from the terminal end of the first air passage to the air outflow ports 36 formed on the circumferential surface of the partial region 33 (see arrow A13 in FIG. 1). That is, the bore 34 of the shaft 3 of the present example extends in a liner fashion from the end face 320 of the second end part 32 to the partial region 33, splits into two branches, and then reaches the circumferential surface of the partial region 33.

Since, in the above-mentioned way, the air outflow ports 36 of the present example are located at the back of the constricted part 214 of the housing 2 in the axial direction, the purge air passing through the bore 34 of the shaft 3 flows from the air outflow ports 36 to the axial direction gap 25 inside of the housing 2. The purge air flowing into the axial direction gap 25 then passes through the ring-shaped opening 24 around the shaft 3 to be discharged to the outside of the housing 2. Therefore, according to the electric motor M of the present example, it is possible to reliably prevent entry into housing 2 of foreign matter such as washing water or cutting oil which reaches a vicinity of the ring-shaped opening 24. Further, according to the electric motor M of the present example, the air which is supplied to the inside space 26 of the housing 2 moves to the axial direction gap 25 inside the housing 2 through the bore 34 which is formed on the shaft 3, and therefore it is no longer necessary to provide various parts of the housing 2 with complicated shape air passages. That is, according to the electric motor M of the present example, it is no longer necessary to provide the housing 2 with a complicated shape air passage which bypasses the front bearing 4A to reach the axial direction gap 25.

Further, according to the electric motor M of the present example, the air which is supplied to the inside space 26 of the housing 2 does not pass through the narrow gap between the rotor core 1 and the stator core 20, but passes through the first air passage which extends inside the shaft 3 in a linear fashion along the axial direction (see arrow A12 in FIG. 1), and therefore it is possible to reduce the pressure loss which is generated when the air reaches the ring-shaped opening 24 around the shaft 3 in the front part 21 of the housing 2. In this way, according to the electric motor M of the present example, it is possible to realize efficient air purge of the housing 2 which is generally sealed, except for the ring-shaped opening 24 and air feed hole 27. Further, according to the electric motor M of the present example, the bore 34 of the shaft 3 is only formed of a first bore which extends from the end face 320 of the second end part 32 to the partial region 33 along the axial direction, and a second bore which extends vertically to the first bore at the terminal end of the first bore to penetrate through the partial region 33, and therefore it is possible to simplify the production process of the shaft 3 with the bore 34.

Figure 2:
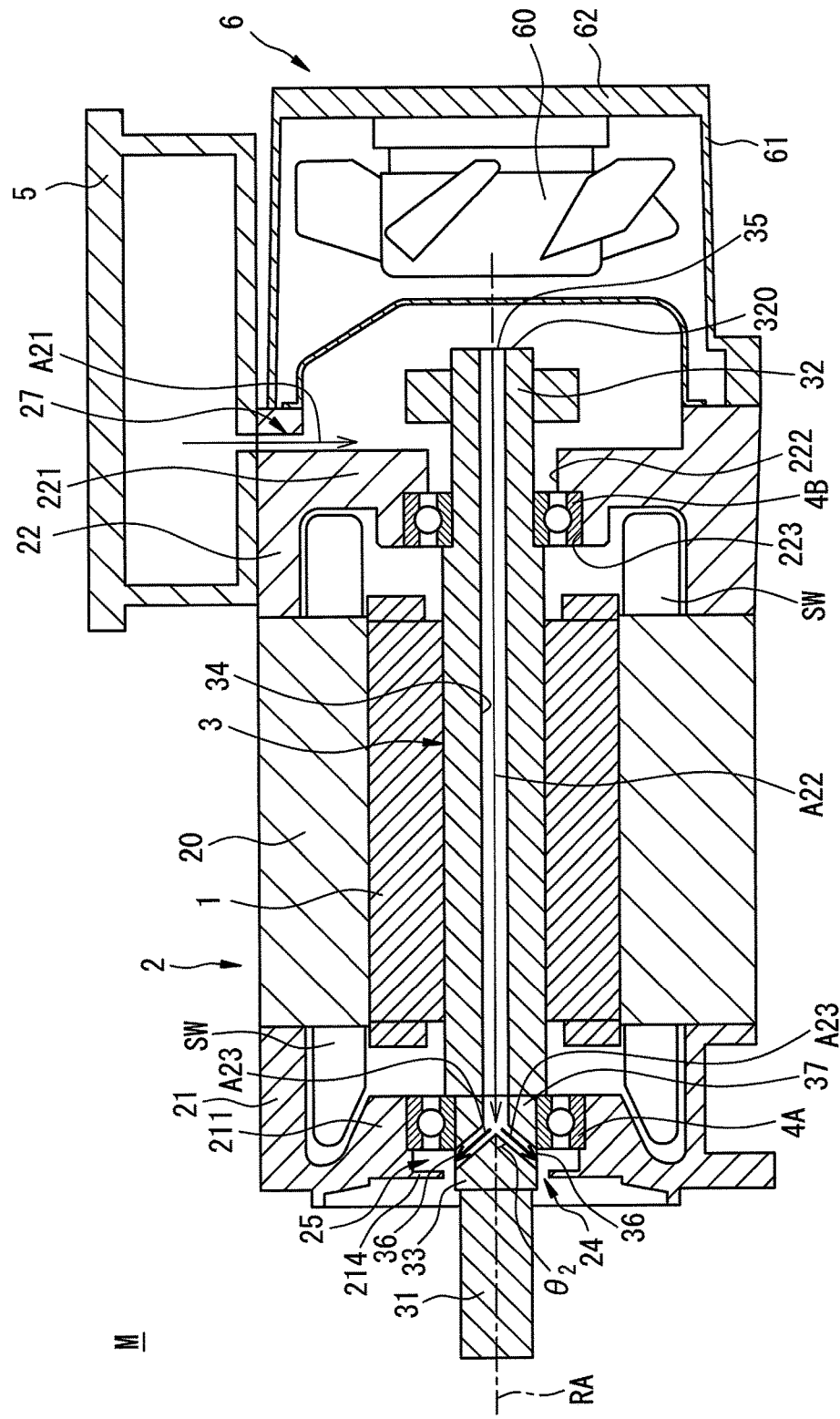
FIG. 2 is a longitudinal cross-sectional view which shows a modification of an air purge structure of an electric motor according to the present embodiment.

Next, a modification of the air purge structure of the electric motor M according to the present embodiment will be explained. FIG. 2 is a longitudinal cross-sectional view similar to FIG. 1 which shows a modification of the air purge structure of the electric motor M. The parts of the electric motor M of FIG. 2 are assigned similar reference numerals as the parts of the electric motor M of FIG. 1. As will be understood from a comparison between FIG. 1 and FIG. 2, the electric motor M in the two figures only differ in the shape of the bore 34 which is formed on the shaft 3. More specifically, the bore 34 of the shaft 3 in FIG. 2 forms a first air passage which extends from the air inflow port 35 which is formed on the end face 320 of the second end part 32 to the partial region 37 of the shaft 3 which corresponds to the front bearing 4A (see arrow A22 in FIG. 2) and second air passages which extend from the terminal end of the first air passage to the air outflow ports 36 which are formed on the circumferential surface of the partial region 33 at a slant to the axial direction and in a direction away from the rotor core 1 (see arrow A23 in FIG. 2). Note that, the arrow A21 in FIG. 2, in the same way the arrow A11 in FIG. 1, shows the flow path of air which is fed to the inside space 26 through the air feed hole 27.

In this way, the inclination angle $\theta_1$ of the second air passages with regard to the axial direction in FIG. 1 is 90° ($\theta_1=90°$), while the inclination angle $\theta_2$ of the second air passages with regard to the axial direction in FIG. 2 is larger than 0° and smaller than 90° ($0°<\theta_2<90°$). Preferably, the inclination angle $\theta_2$ of the second air passages with regard to the axial direction in FIG. 2 is larger than 0° and smaller than 45° ($0°<\theta_2<45°$). This allows for relatively small flow resistance to the air which flows into each of the second air passages after reaching the terminal end of the first air passage, and therefore it is possible to further reduce the pressure loss which is generated when the air which is fed to the inside space 26 of the housing 2 reaches the ring-shaped opening 24 around the shaft 3. In this way, according to the electric motor M of the present example, it is possible to realize a further effective air purge of the housing 2 which is generally sealed, except for the ring-shaped opening 24 and air feed hole 27.

Effect of Invention

According to the first aspect of the present invention, purge air is fed to the inside space of the housing through the air feed hole, and therefore it is possible to reliably prevent foreign matter such as washing water or cutting oil from entering into the housing after reaching the vicinity of the ring-shaped opening around the shaft at the front end of the housing. Further, according to the first aspect, the air which is fed to the inside space of the housing moves to the axial direction gap at the inside of the housing through the bore which is formed on the shaft, and therefore so it is no longer necessary to provide various parts of the housing with complicated shape air passages. That is, according to the first aspect, it is no longer necessary to provide the housing with a complicated shape air passage which bypasses the front bearing which supports the shaft to reach the axial direction gap.

According to the second aspect of the present invention, the air which is supplied to the inside space of the housing does not pass through the narrow gap between the rotor core and the stator core, but passes through the first air passage which extends inside the shaft in a linear fashion along the axial direction, and therefore it is possible to reduce the pressure loss which is caused when the air reaches the ring-shaped opening around the shaft at the front part of the housing. In this way, according to the second aspect, it is possible to realize efficient air purge of the housing which is generally sealed, except for the ring-shaped opening around the shaft and the air feed hole.

According to the third aspect of the present invention, the bore of the shaft is only formed of a first bore which extends from the end face of the second end part to the partial region along the axial direction and a second bore which extend vertically to the first bore at the terminal end of the first bore to penetrate through the partial region, and therefore it is possible to simplify the production process of a shaft with a bore.

According to the fourth aspect of the present invention, there is relatively small flow resistance to the air which flows to each of the second air passages after reaching the terminal end of the first air passage, and therefore it is possible to further reduce the pressure loss which is generated when the air which is supplied to the inside space of the housing reaches the ring-shaped opening around the shaft. In this way, according to the fourth aspect, it is possible to realize a more effective air purge of the housing which is generally sealed, except for the ring-shaped opening around the shaft and air feed hole.

The present invention is not limited to the above-mentioned embodiment and can be modified in various ways within the scope described in the claims. For example, so long as the air inflow port 35 of the bore 34 of the shaft 3 is formed on the second end part 32 which is located at the inside space 26 of the housing 2, the number and location, etc., of air inflow port 35 of the bore 34 are not limited to only the example which is shown in FIG. 1 and FIG. 2, etc., Similarly, so long as the air outflow ports 36 of the bore 34 of the shaft 3 are formed on the circumferential surface of the partial region 33 which is located between the first end part 31 which projects outward from the housing 2 and the front bearing 4A, the number and location, etc., of air outflow ports 36 of the bore 34 are not limited to only the example which is shown in FIG. 1 and FIG. 2, etc., Further, in the above embodiment, an SPM (surface permanent magnet) motor with permanent magnets attached to the outer circumferential surface of the rotor core is employed, but the electric motor M of the present invention may also be an IPM (interior permanent magnet) motor with permanent magnets embedded in the rotor core or a motor with another structure. Further, the dimensions, shapes, materials, etc. of the parts of the above-mentioned electric motor M are only examples. Various dimensions, shapes, materials, etc. can be employed for achieving the effects of the present invention.

The invention claimed is:

1. An electric motor comprising:
a tubular housing which holds a rotor core,
a shaft which is fastened to said rotor core and which has a first end part which projects outward from said housing and a second end part which is located inside said housing, and
a bearing which is located between said first end part and said rotor core and which supports said shaft to be able to rotate inside said housing, and
a fan located adjacent to the second end part of the rotor but not in contact therewith, wherein the fan is separated from the second end part of the rotor by a back cover to create an inside space between the back cover and the second end part of the rotor, wherein
said housing is provided with an air feed hole to which an air feed source can be connected for feeding compressed air for an air purge to the inside space where said second end part is located, and
said shaft is provided with a bore which extends from an air inflow port for the compressed air which is formed on said second end part, to an air outflow port for the compressed air which is formed on a circumferential surface around the rotation axis of a partial region of said shaft which is located between said first end part and said bearing, wherein the inside space is isolated from the fan by the back cover so that the fan can operate while compressed air is fed to the air feed hole to perform an air purge.

2. The electric motor according to claim 1, wherein said bore forms a first air passage which extends from an end face of said second end part along an extension direction of said shaft and a second air passage which extends from a terminal end of an extension direction of said first air passage to said circumferential surface.

3. The electric motor according to claim 2, wherein said second air passage extends vertically with respect the extension direction of said shaft.

4. The electric motor according to claim 2, wherein said second air passage extends at a slant with respect to the extension direction of said shaft and in a direction away from said rotor core.

* * * * *